Jan. 14, 1941.  C. LUSSENHOP  2,228,605
FENCE STRETCHER
Filed April 1, 1940

Carl Lussenhop INVENTOR
BY Victor J. Evans & Co.
ATTORNEYS

Patented Jan. 14, 1941

2,228,605

UNITED STATES PATENT OFFICE 2,228,605

FENCE STRETCHER

Carl Lussenhop, Redwood Falls, Minn.

Application April 1, 1940, Serial No. 327,318

1 Claim. (Cl. 254—83)

This invention relates to fence stretchers and has for an object to provide a stretcher which may be easily applied to a fence without the use of bolts, hooks, or other mechanical devices.

Another object of the invention is to provide a stretcher which will not injure a fence, and which will stretch two or three sections of fence at one time.

Another object of the invention is to promote a great saving of time in hooking and unhooking the stretcher from a tractor, or truck, which is moved forward to tighten the fence, and backed to release the stretcher from the fence.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1:
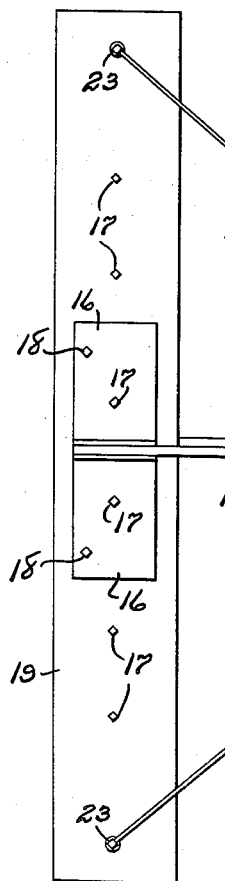
Fig. 1 is a side elevation of the device.
Figure 3:
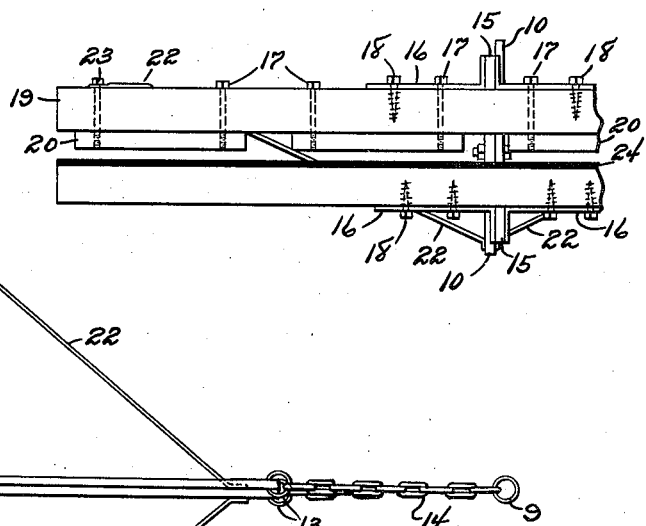
Fig. 3 is a front elevation of the device, partly broken away.
Figure 2:
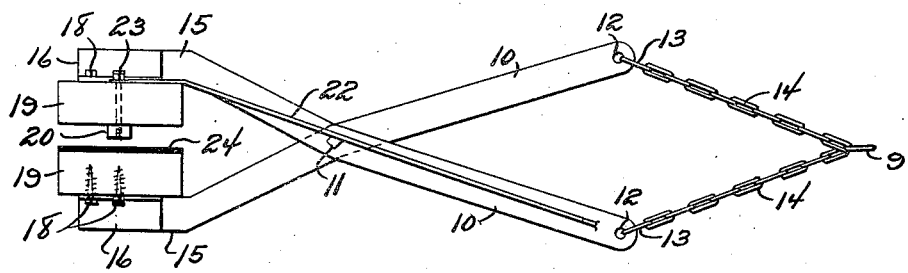
Fig. 2 is a top plan view of the device.

Referring now to the drawing in which like characters of reference designate similar parts in the various views, 10 designates two crossed levers pivotally connected together at their crossing by a bolt 11. Near the rear ends of the levers 10 are apertures 12 which receive rings 13 attached to respective converging chains 14 which are fastened to a ring 9 adapted to be connected to a tractor or truck. The front ends 15 of the levers are each received between and are welded to angle brackets 16. Bolts 17 and screws 18 secure the brackets to respective bars 19 which form clamping jaws.

Spaced cleats 20 are secured to the working face of one of the jaws 19. The cleats extend longitudinally of the jaw and hold the wire fence in position when both jaws 19 are brought together by closing movement of the levers 10. A pair of converging brace rods 22 are secured at the front ends to the ends of the cleated jaw 19 by bolts 23 and are secured at the rear ends to one of the levers 10 near the aperture 12 thereof by welding or any other means. The working face of the jaw opposite the cleated jaw is equipped with a strip of rubber 24 to protect the fence from becoming damaged or marred when it is being stretched.

When it is desired to stretch a fence, a tractor or truck is used, and the ring 9 is attached to the rear end of the vehicle. The tractor or truck is backed to loosen the chains 14 which allow the rear ends of the pivoted levers 10 to move away from each other until the jaws 19 are opened to receive the fence between the cleats 20, on the working face of one of the jaws, and the rubber facing 24 of the other jaw. The vehicle is then moved forward to tighten the chains 14 which force the rear ends of the levers 10 toward each other, and the jaws 19 toward each other until the cleats 20 bind the fence tightly against the rubber facing strip 24. To release the fence stretcher the vehicle is simply backed to slack off the chains 14 and permit the jaws to open.

From the above description it is thought that the construction and operation of this invention will be fully understood without further explanation.

What is claimed is:

A fence stretcher comprising two crossed levers pivotally connected together at their crossing, each lever having an aperture near the rear end, rings engaged in said apertures, converging chains secured to said rings, a ring secured to the meeting ends of said chains adapted to be connected to a tractor or truck, bars forming clamping jaws, angle brackets secured to said jaws, the front ends of the levers being each received between and secured to a pair of said angle brackets, spaced cleats secured to the working face of one of the jaws and extending longitudinally of the jaw, said cleats being adapted to hold a wire fence in position when both jaws are brought together by closing movement of the levers, a pair of converging brace rods secured at the front ends to the ends of said cleated jaw and secured at the rear ends to one of said levers near the aperture thereof, and a rubber strip on the working face of the jaw opposite the cleated jaw adapted to protect the fence from becoming damaged or marred while being stretched.

CARL LUSSENHOP.